United States Patent
Kumakura et al.

(10) Patent No.: US 6,428,435 B1
(45) Date of Patent: Aug. 6, 2002

(54) TENSIONER LEVER FOR CHAIN DRIVE

(75) Inventors: Atsushi Kumakura; Fumiaki Oba, both of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/532,350

(22) Filed: Mar. 21, 2000

(30) Foreign Application Priority Data

Mar. 24, 1999 (JP) ............................................. 11-079304

(51) Int. Cl.[7] ................................................. F16H 7/08
(52) U.S. Cl. ....................................... 474/111; 474/140
(58) Field of Search ............................... 474/101, 109, 474/111, 133, 135, 138, 140

(56) References Cited

U.S. PATENT DOCUMENTS

| | | | |
|---|---|---|---|
| 3,148,555 A | * 9/1964 | Peras | 474/138 X |
| 3,198,025 A | * 8/1965 | Peras | 474/111 X |
| 4,816,011 A | * 3/1989 | Kotzab | 474/111 |
| 4,976,659 A | * 12/1990 | Hans et al. | 474/111 |
| 5,073,158 A | * 12/1991 | Ojima | 474/138 |
| 5,366,418 A | 11/1994 | Fukushima | |
| 5,647,812 A | * 7/1997 | McDonald et al. | 474/111 |
| 5,662,540 A | * 9/1997 | Schnuepke et al. | 474/111 |
| 6,086,498 A | * 7/2000 | Hashimoto | 474/111 |

FOREIGN PATENT DOCUMENTS

| | | |
|---|---|---|
| DE | 1 238 299 | 11/1967 |
| DE | 38 10 188 A1 | 10/1989 |
| DE | 42 43 451 A1 | 6/1994 |
| DE | 44 37 926 C1 | 2/1996 |
| GB | 323697 | 1/1930 |
| GB | 2 294 522 A | 5/1996 |

* cited by examiner

*Primary Examiner*—David A. Bucci
*Assistant Examiner*—Colby Hansen
(74) *Attorney, Agent, or Firm*—Dann, Dorfman, Herrell and SKillman, P.C.; Henry H. Skillman

(57) ABSTRACT

A tensioner lever for chain drives has an internal space formed therein for accommodating within it at least a coiled portion of a torsion coil spring. The internal space has an opening for enabling the torsion coil spring to be assembled in the internal space. The lever body further has a boss disposed inside the internal space. The boss has an axial hole through which a pivot shaft extends and an outer peripheral surface around which the coiled portion of the torsion coil spring is loosely fitted, the axial hole and the outer peripheral surface being concentric with each other. The tensioner lever of the foregoing construction requires only a small space for installation to a mount surface and can be easily and speedily assembled onto the mount surface.

1 Claim, 7 Drawing Sheets

TENSIONER LEVER FOR CHAIN DRIVE

BACKGROUND OF THE INVENTION

1. Field of the Invention

The present invention relates generally to a tensioner lever for a chain drive, and more particularly to a tensioner lever of the type using the resilient force of a torsion coil spring which urges a shoe surface of the tensioner lever against a chain to prevent the chain from becoming loose.

2. Description of the Related Art

In a chain drive used in an auxiliary device, for example, of an automobile engine for transmitting rotation between two or more spaced shafts, a tensioner lever is employed to remove the slack of a chain to thereby prevent whipping of the chain while running.

FIG. 9 shows one example of the conventional tensioner lever of the type concerned. The tensioner lever A1 is rotatably supported on a mount surface R of an engine body by means of a pivot shaft A2. A shoe surface S provided in a longitudinal direction of the tensioner lever A1 is adapted to be held in sliding contact with the outer circumferential surface of a slack run of an endless chain A3.

A torsion coil spring A5 is wound around and supported by a support pin A4 projecting from the mount surface A. The torsion coil spring A5 has one arm a engaged with a surface of the tensioner lever which is located on a side opposite to the shoe surface S. The other arm b of the torsion coil spring AS is in engagement with a retaining member Q provided on the mount surface R. By the force of the torsion coil spring S5, the tensioner lever A1 is urged to turn about the pivot shaft A2 in the clockwise direction shown in FIG. 9. As a result, the shoe surface S presses or forces at all times the outer peripheral surface of the chain slack side toward the interior side of the chain A3, thereby preventing the chain from becoming loose.

FIG. 10 shows another example of the conventional tensioner lever. The illustrated tensioner lever B1 has the same function as the tensioner lever A1 show in FIG. 9 but differs therefrom in that a torsion coil spring B3 used for urging a shoe surface S against a chain B2 has a helically coiled portion supported concentrically with a pivot shaft B4 on which the tensioner lever B1 is rotatably supported with respect to a mount surface R.

As clearly shown in FIG. 11, the tensioner lever B1 has a boss B5 projecting toward the mount surface R. The coiled portion of the torsion coil spring B3 is fitted around the boss B5. One arm a' of the torsion coil spring B3 is engaged with the tensioner lever B5, and the other arm b' of the tensioner lever B1 is engaged with a spring retainer pin B6 projecting from the mount surface R.

In the conventional tensioner lever 9 show in FIG. 9, since the torsion coil spring A5 and the spring support pin A4 are disposed on a side of the tensioner lever A1, these parts requires an installation space on the mount surface R which is provided on the exterior side of the endless chain A3.

In the conventional tensioner lever B1 shown in FIGS. 10 and 11, since the torsion coil spring B3 is supported on the pivot shaft B4 together with the tensioner lever B1, a space for installation of these parts on the mount surface R is relatively small. However, due to the provision of the boss B5 disposed between the tensioner lever B1 and the mount surface R, the overall height of the tensioner lever B1 as measured from the mount surface R is made large.

Additionally, in the foregoing conventional tensioner levers, since the torsion coil spring is assembled with the tensioner lever when the tensioner lever is mounted to the mount surface, the assemblage of the conventional tensioner levers is relatively low in efficiency.

SUMMARY OF THE INVENTION

It is therefore an object of the present invention to provide a tensioner lever for chain drives, which requires only a small space for installation to a mount surface and can be easily and speedily assembled onto the mount surface.

To attain the foregoing object, the present invention provides a tensioner lever for a chain drive including an endless chain driven to travel over a mount surface, wherein the tensioner lever comprising: a lever body pivotally mounted at one end to the mount surface by means of a pivot shaft, the lever body having a shoe surface extending in a longitudinal direction thereof; and a torsion coil spring acting between the mount surface and the lever body and urging the lever body to turn about the pivot shaft in a direction to move the shoe surface into pressure contact with the chain. The lever body has an internal space formed therein for accommodating within it at least a coiled portion of the torsion coil spring, the internal space having an opening for enabling the torsion coil spring to be assembled in the internal space. The lever body further has a boss disposed inside the internal space and having an axial hole through which the pivot shaft extends and an outer peripheral surface around which the coiled portion of the torsion coil spring is loosely fitted, the axial hole and the outer peripheral surface being concentric with each other.

With this construction, since at least the coiled portion of the torsion coil spring is disposed inside the lever body, there is no need to provide a space on the exterior side of the lever body for installation of the torsion coil spring. By virtue of this, the tensioner lever can be mounted on a relatively narrow mount surface.

It is preferable that the lever body includes a spring engagement portion engageable with a portion of the torsion coil spring to keep the torsion coil spring in position against removal from the lever body through the opening. Since the torsion coil spring is stably held or assembled on the lever body, the lever body can be readily mounted to the mount surface. Additionally, since the lever body and the torsion coil spring assembled thereon can be treated as a preassembled single part, storage, transportation and other processing of the parts can be achieved simply less costly.

In one preferred form, the lever body has a peripheral wall forming the internal space and a cutout portion formed in a part of the peripheral wall. The torsional coil spring has an arm contiguous with one end of the coiled portion and being anchored to the mount surface, the arm extending through the cutout portion to the exterior side of the lever body. The spring engagement portion is comprised of an engagement recess formed in the peripheral wall at one end of the cutout portion for retaining therein a portion of the arm when the arm is urged toward the one end of the cutout portion by the resiliency of the torsion coil spring before the arm is anchored to the mount surface. With the arm part thus retained in the engagement recess, assemblage and replacement of the torsion coil spring relative to the lever body can be achieved with utmost ease.

In another preferred form, the lever body has a peripheral wall forming the internal space, the torsion coil spring has an arm contiguous with one end of the coiled portion and being anchored to the lever body, and the spring engagement portion is comprised of a wing-like spring retaining piece projecting from the peripheral wall into the internal space at a portion adjacent to the shoe surface for retaining thereon the arm of the torsion coil spring. The spring engagement piece projecting from the peripheral wall of the lever body is simple in construction and can be formed integrally with the lever body by die-casting or synthetic resin molding.

In still another preferred form, the spring engagement portion is comprised of at least one radial engagement projection formed on the outer peripheral surface of the boss at an end adjacent to the opening, the radial engagement projection having an outside diameter larger than an inside diameter of the coiled portion of the torsion coil spring. The torsion coil spring is stably held within the internal space of the lever body with the coiled portion retained on the radial engagement projection.

BRIEF DESCRIPTION OF THE DRAWINGS

Certain preferred embodiments of the present invention will now be described in detail, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Figure 1:
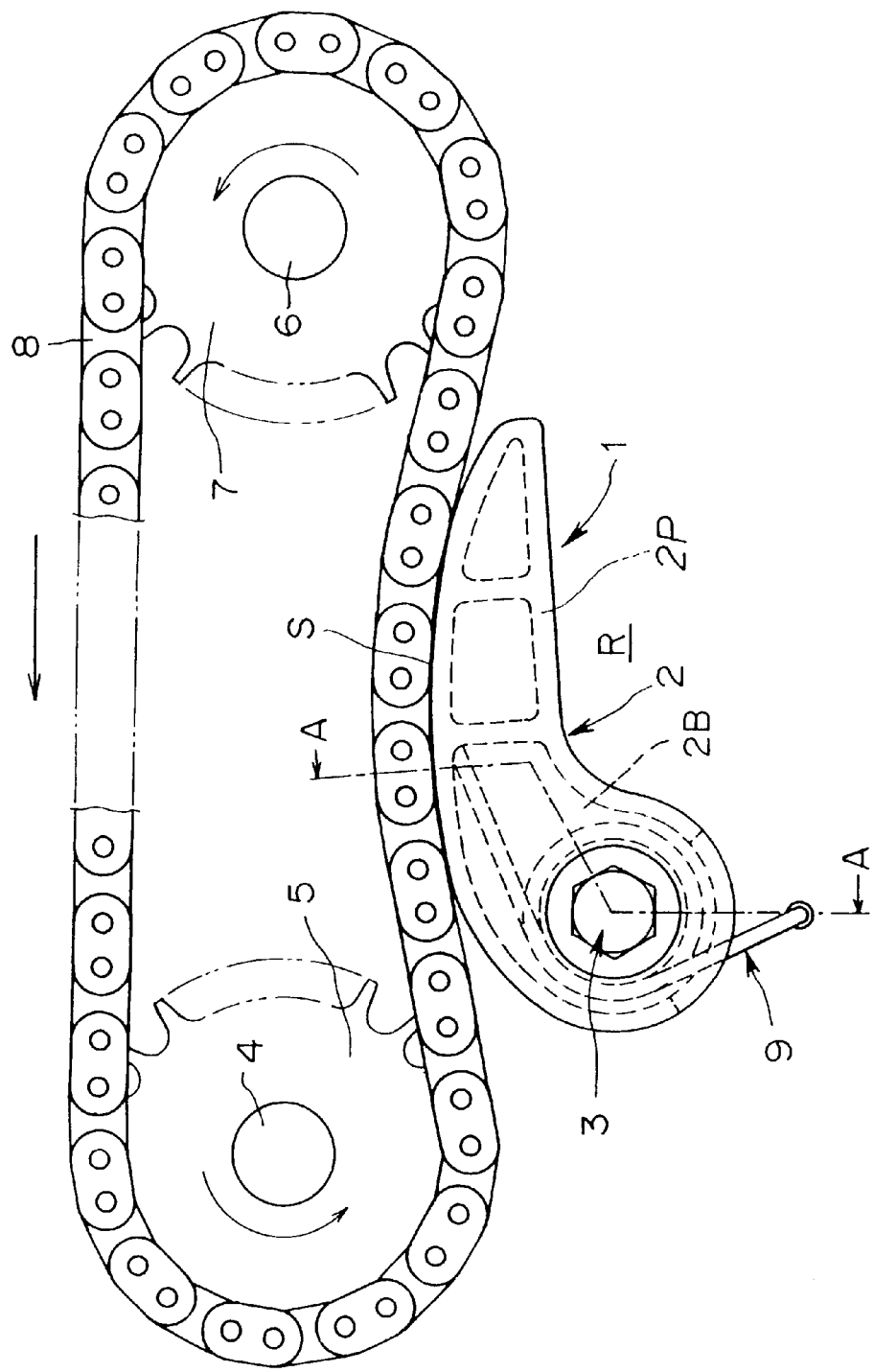
FIG. 1 is a front elevational view of a chain drive in which a tensioner lever according to a first embodiment of the present invention is incorporated.

Referring to FIG. 1, there is shown a chain drive in which a tensioner lever 1 according to a first embodiment of the present invention is incorporated. The tensioner lever 1 has a lever body molded of synthetic resin and pivotally mounted at one end to a mount surface R of an engine body by means of a pivot shaft 3.

The tensioner lever 1 has a shoe surface S formed on the lever body 2 along a longitudinal side thereof for sliding engagement with the outer circumferential surface of a slack run (also called "slack side") of an endless chain 8 which is trained around a drive sprocket 5 mounted on a crankshaft 4 and a driven sprocket 7 mounted on a shaft 6 of an auxiliary device. The lever body 2 is urged by the force of a torsion coil spring 9 to turn about an axis of the pivot shaft 3 in a direction to force the shoe surface S into pressure contact with the chain 8 to thereby prevent the chain 8 from becoming slack or loose.

Figure 2:
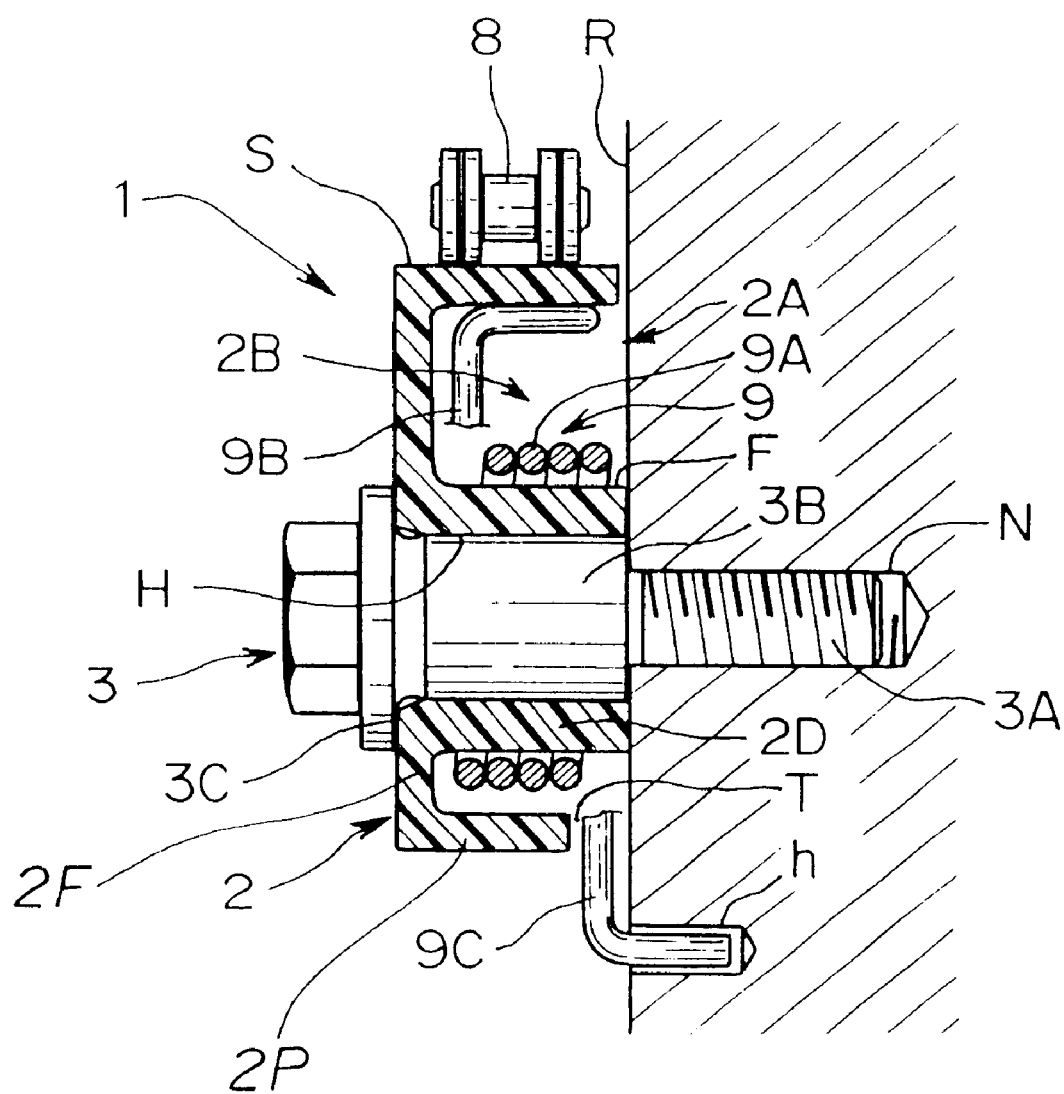
FIG. 2 is a cross-sectional view taken along line 2—2 of FIG. 1.
Figure 3:
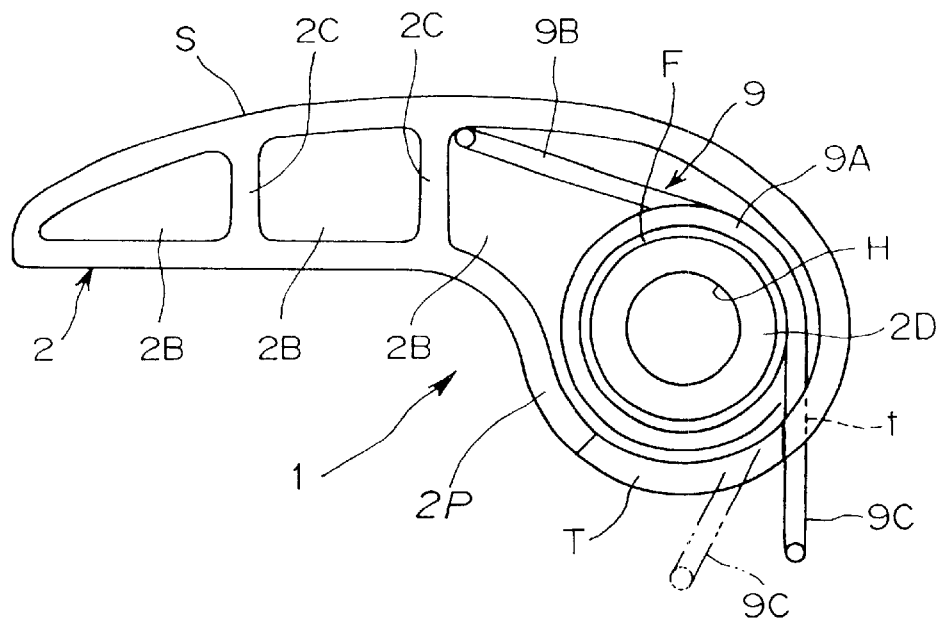
FIG. 3 is a rear view of the tensioner lever shown in FIG. 1.

As shown in FIG. 2, the lever body 2 has a general hollow structure including an internal space 2B formed therein. The internal space 2B is defined by a top wall 2F and a peripheral wall 2P and has a bottom opening 2A facing the mount surface R. The internal space 2B, as shown in FIG. 3, is divided into plural (three in the illustrated embodiment) sub-spaces by means of reinforcement ribs 2C provided at intervals in the longitudinal direction of the lever body 2.

Referring back to FIG. 2, the pivot shaft 3 is comprised of a shouldered bolt with flanged head which includes a shouldered shank composed of a thread-free round, large-diameter shoulder portion 3B adjacent to the head and an externally threaded small-diameter leg portion 3A remote from the head. The externally threaded leg portion 3A is threaded into an internally threaded hole N in the mount surface R so that the shouldered bolt (pivot shaft) 3 is firmly secured to he mount surface R.

The lever body 2 has a cylindrical boss 2D formed integrally therewith and disposed inside the internal space 2G. The boss 2D has an axial hole H through which the shoulder portion 3B of the pivot shaft 3 extends.

The boss 2D has an end face held in face to face with the mount surface R. The end face of the boss 2D slightly projects from the opening 2A to the exterior side of the lever body 2. Accordingly, while the lever body 2 is undertaking its pivotal motion, all parts of the lever body 2 except the end face of the boss 2D are held out of contact with the mount surface R. Thus, the boss 2D enables smooth pivotal movement of the lever body 2 relative to the pivot shaft 3 without causing wobbling therebetween. The flange 3C formed on the pivot shaft 3 functions to limit movement of the lever body 2 in the axial direction of the pivot shaft 3.

The boss 2D has an outer peripheral surface F formed concentrically with the axial bore hole H, and a helically coiled portion 9A of the torsion coil spring 9 is loosely fitted around the mounted peripeheral surface F of the boss 2D.

The torsion coil spring 9 has a first arm 9B extending contiguously from one end of the coiled portion 9A. The first arm 9B has a free end portion bent toward the opening 2A and held in abutment with the inner surface of a portion of the peripheral wall 2P defining part of the internal space on the side adjacent to the shoe surface S.

The torsion coil spring 9 also has a second arm 9C extending contiguously from the other end of the coiled portion 9A. The second arm 9C projects from the internal space 2B to the exterior side of the lever body 2 through a cutout portion T formed in another portion of the peripheral wall 2P. The second arm 9C has a free end portion bent toward the mount surface R and inserted in a spring retaining hole h formed in the mount surface R.

In this condition, the torsion coil spring 9 is resiliently deformed or otherwise distorted so that it produces a rotational force or torque tending to turn the tension lever 2 about the axis of the pivot shaft 3 in the counterclockwise direction shown in FIG. 1. Thus, the outer circumferential surface of the chain 8 is forced toward the interior side of the chain 8 via the shoe surface S.

Figure 4:
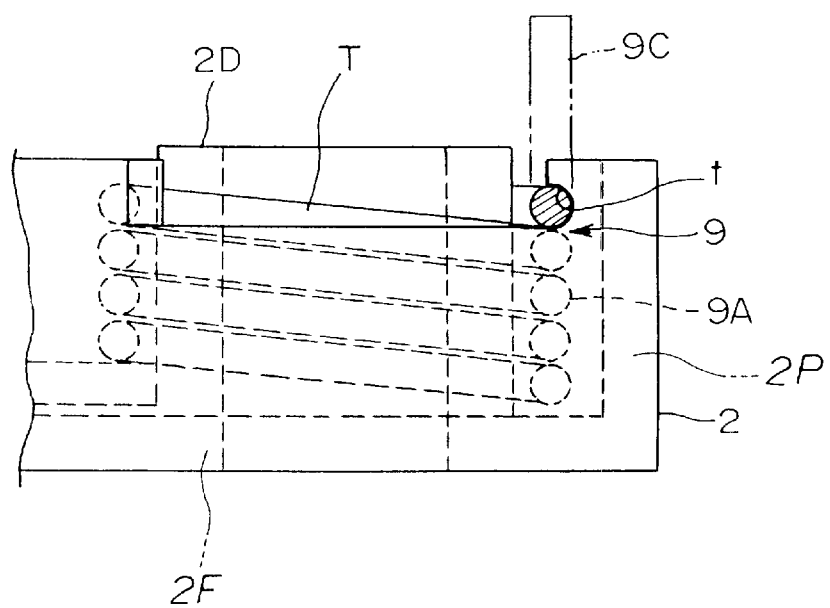
FIG. 4 is an enlarged fragmentary side view showing a portion of the tensioner lever shown in FIG. 1.

As shown in FIGS. 3 and 4, the cutout portion T extends circumferentially about the axis of the axial hole H over an angular range of about 60°. At one end of the cutout portion T, which is aligned with the direction of force applied from the second arm 9C, there is formed a semicircular engagement recess t in which second arm 9C is firmly retained. The semicircular engagement recess t forms a spring engagement portion.

Prior to the attachment of the lever body 2 on the monunt surface R, the engagement recess t retains within it a portion of the second arm 9C while the torsion coil spring 9 is in an assembled condition with the lever body 2. The recess t is of sufficient depth to engage a button portion of the arm 9C. Thus, the torsion coil spring 9 is held in position against detachment from the internal space 2B lever body 2.

Additionally, by virtue of the engagement recess t, the second arm 9C of the torsion oil spring 9, which is projecting outward from the lever body 2, is positioned relative to the lever body 2. Accordingly, when the tensioner lever 1 is to be assembled onto the mount surface R, the free end portion of the second arm 9C can be readily inserted in the spring retaining hole h in the mount surface R.

In the condition where the pivot shaft 3 inserted into the axial hole H of the boss 2D is firmly threaded into the internally threaded hole N in the mount surface R, the torsion coil spring 9 is resiliently deformed or distorted until the second arm 9C assumes the position indicated by the phantom lines shown in FIG. 3. The torsion coil spring 9 thus distorted stores therein a necessary resilient torsion force for removing a slack of the chain 8.

In the embodiment described above, assemblage of the torsion coil spring 9 relative to the lever body 2 can readily by achieved by first inserting the torsion coil spring 9 from the opening 2A into the internal space 2B of the lever body 2 with the first arm 9B directed forward abutting the peripheral wall 2P, then fitting the coiled portion 9A of the torsion coil spring 9 around the boss 2D, and finally placing the second arm 9C of the torsion coil spring 9, against the resiliency thereof, into fitting engagement within the engagement recess t formed at one end of the cutout portion T of the lever body 2. Abutment of the arm 9C with the cutout portion maintains the spring in a state of torsion.

Figure 5:
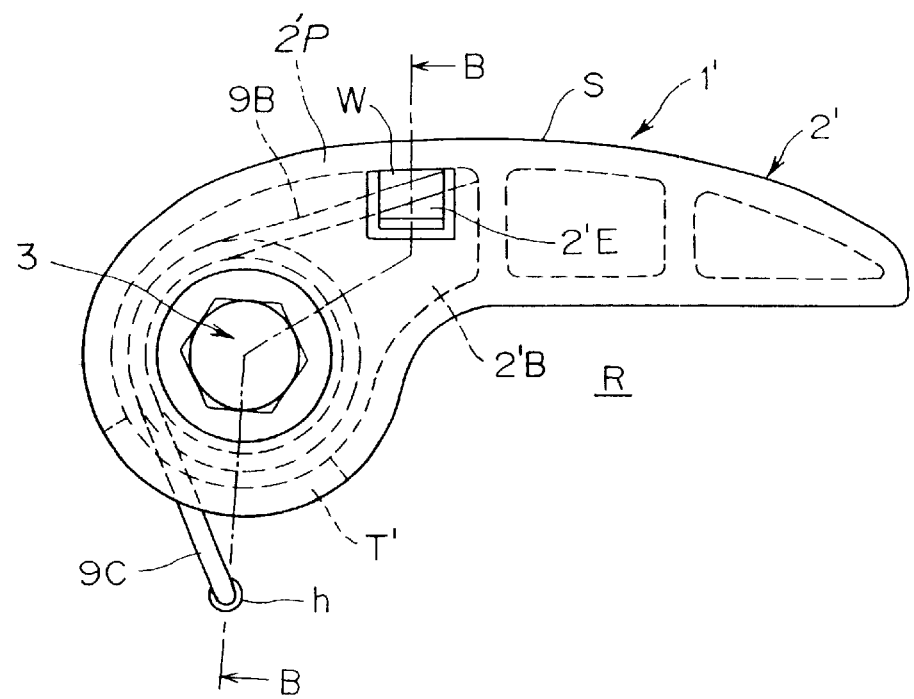
FIG. 5 is a front elevational view of a tensioner lever according to a second embodiment of the present invention.
Figure 6:
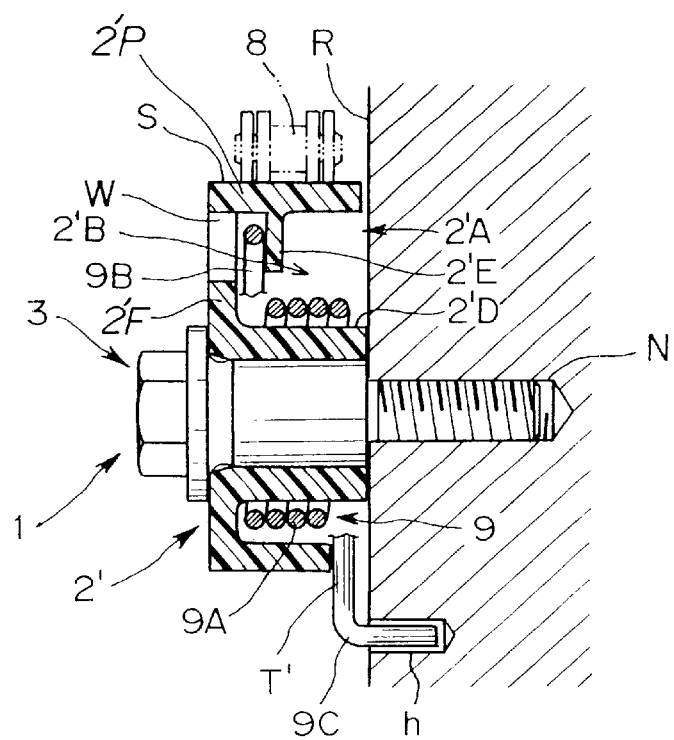
FIG. 6 is a cross-sectional view taken along line 6–6 of FIG. 5.

FIGS. 5 and 6 show a tensioner lever according to a second embodiment of the present invention. The illustrated tensioner lever 1' differs from the tensioner lever 1 of the foregoing embodiment only in the structure of a lever body 2'. In FIGS. 5 and 6, these parts which are designated by the same reference characters as those shown in FIGS. 1–4 are identical in structure to the corresponding parts in the foregoing embodiment, and no further description thereof is necessary.

The lever body 2' includes a spring engagement portion comprised of a wing-like spring retaining piece 2'E formed integrally with a portion of the peripheral wall 2'P located adjacent a shoe surface S. The spring retaining piece 2'E projects from the peripheral wall portion into the internal space 2'B of the lever body 2' engaging under a bottom portion of a first arm 9B of the spring 9 for retaining thereon a first arm 9B of the torsion coil spring 9 when engage with the peripheral wall 2'P of the lever body 2'.

The position of the spring retaining piece 2'E in the axial direction of the boss 2'D is determined such that by the spring retaining piece 2'E the spring arm 9B is retained at a position located close to a top wall 2'F of the lever body 2' on the opposite side of the opening 2'A. With the spring engagement portion (spring retaining piece) 2'E thus provided, the torsion coil spring 9, which is assembled in the lever body 2' with its coiled portion 9A loosely fitted around the boss 2D, can be stably held in position against detachment from the lever body 2'.

A second arm 9C of the torsion coil spring 9 projects from the internal space 2'B to the exterior side of the lever body 2' through a cutout portion T formed in the peripheral wall 2'P of the lever body 2'. The second arm 9C has a bent free end portion inserted in a spring retaining hole h formed in the mount surface R.

In the illustrated embodiment, the lever body 2' is molded of synthetic resin. For enabling integral formation of the wing-like spring retaining piece 2'E by molding, the lever body 2' has a small aperture or window W formed in the top wall 2'F at a position corresponding to the spring retaining piece 2'E. The window W can be used as an observation hole for enabling visually observation or checking of the position of the first arm 9B when the torsion coil spring 9 is assembled in the lever body 2', and also as an access hole for receiving the tip end of a suitable tool such as a screwdriver when the first arm 9B is to be disengaged from the spring retaining piece 2'E to release the torsion coil spring 9 from the lever body 2'. tensioner lever 1" differs from those 1 and 1' of the foregoing embodiments only in the structure of a lever body 2".

The tensioner body 2" includes a spring engagement portion comprised of a plurality (three in the illustrated embodiment) of circumferentially spaced radial engagement projections f formed on an outer peripheral surface of the boss 2"D at an end thereof adjacent to the opening 2"A. The radial projections f are spaced at equal angular intervals in the circumferential direction of the boss 2"D and have a minimum outside diameter larger than an inside diameter of a coiled portion 9A of the torsion coil spring 9. By the radial engagement projections f thus provided, the coiled portion 9A of the torsion coil spring 9 is stably held in position against removal from the boss 2"D.

Like in the foregoing embodiments, a first arm 9B of the torsion coil spring 9 has a first arm 9B with a free end portion held in abutment with an inner surface of the peripheral wall 2"P of the lever body 2", and a second arm 9C projects from the internal space 2"B to the exterior side of the lever body 2" through a cutout portion T" formed in the peripheral wall 2"P at a portion adjacent to a shoe surface S, the second arm 9C having a free end inserted into a spring retaining hole h formed in the mount surface R.

For assembling the torsion coil spring into the lever body 2", the coiled portion 9A of the torsion coil spring 9 is resiliently deformed until the inside diameter of the coiled portion 9A exceeds the outside diameter of the radial engagement projections f of the boss 2"D. While keeping this condition, the coiled portion 9A of the torsion coil spring 9 is forced through the opening 2"A onto the boss 2"D with the first arm 9B directed forward. When the trailing end of the coiled portion 9A moves past the radial engagement portions f, the coiled portion 9A is allowed to spring back into its original shape whose inside diameter is smaller than the outside diameter of the radial engagement projections f. Thus, the coiled portion 9A of the torsion coil spring 9 is held around the boss 2"D.

For facilitating smooth attachment of the coiled portion 9A of the torsional coil spring 9 to the boss 2"D of the lever body 2", it is preferable that a peripheral edge of each radial engagement projection f is rounded or chamfered at a side facing the mount surface R.

In the illustrated embodiment, the lever body 2" is molded of synthetic resin. For enabling integral formation of the boss 2" having the radial locking projections f by molding, the lever body 2" has three circumferentially spaced small arcuate apertures or windows W' formed in the top wall 2"F at a position corresponding to the radial engagement projections f. Each of the windows W can be used as an access hole for receiving the tip end of a suitable tool such as a screwdriver when the coiled portion 9A is to be forced toward the opening 2"A to thereby release the torsion coil spring 9 from the lever body 2.

In the embodiments described above the boss and the lever body are integrally molded of synthetic resin. However, the boss may be made of metal as it is subjected to a concentrated load or force while the lever body is in pivotal motion. As a further alternative, the lever body may be made of metal in which case a portion including the shoe surface portion is formed form a synthetic resin material with high lubricity.

Although in the illustrated embodiments, the second arm of the torsion coil spring, which is used to anchor the torsion coil spring to the mount surface, is exposed to the outside of the lever body, the second arm may be disposed on the interior side of the peripheral wagi of the lever body so as not to be exposed from the lever body. Additionally, in order to anchor the first arm of the torsion coil spring, the lever body may include an aperture formed in a top wall of the lever body adjacent to the peripheral wall.

As an alternative, the opening of the lever body may be disposed around the pivoted end portion of the lever body in which instance the torsion coil spring is assembled with the lever body with its opposite arms both projecting outward from the opening and anchored to pins projecting from the mount surface.

In the embodiments described above, the tensioner lever is used with a chain drive including a chain used for driving an auxiliary device of the engine. The use or application of the tensioner lever of the present invention should by no means be limited to the one shown in the illustrated embodiments, but may include a chain drive including a timing chain used for driving cams of a valve unit of the engine, and another power transmission chain drive including a roller chain or a silent chain having a flat surface adapted for sliding engagement with the shoe surface of the tensioner lever.

Obviously, various minor changes and modifications of the present invention are possible in the light of the above teaching. It is therefore to be understood that within the scope of the appended claims, the present invention may be practiced otherwise than as specifically described.

What is claimed is:

1. A tensioner lever for a chain drive including an endless chain driven to travel over a mount surface, said tensioner lever comprising:

a lever body pivotally mounted at one end to the mount surface by means of a pivot shaft, said lever body having a shoe surface extending in a longitudinal direction thereof; and a torsion coil spring acting between the mount surface and said lever body and urging said lever body to turn about said pivot shaft in a direction to move said shoe surface into pressure contact with the chain, said spring having a coiled portion and a top arm and a bottom arm, said bottom arm being contiguous with the bottom end of said coiled portion and having a cross-section with a given outside dimension, each arm extending outwardly from said coil spring, said lever body having a peripheral wall forming an internal space for accommodating within it at least said coiled portion of said torsion coil spring, said internal space having a top wall engaging the top of said coil spring and a bottom opening for enabling said torsion coil spring to be assembled into said internal space, said spring bottom end facing away from said top wall, said top wall having a boss disposed inside said internal space and having an axial bore through which said pivot shaft extends and an outer peripheral surface around which said coiled portion of said torsion coil spring is loosely fitted, said axial bore and said outer peripheral surface being concentric with each other, said internal space having a first abutment for the top arm and a cutout portion formed in a part of said peripheral wall forming a second abutment for the bottom arm, said bottom arm extending through said cutout portion to the exterior side of said lever body and adapted to be anchored to the mount surface, said abutments maintaining said torsion coil spring in a state of torsion, and said peripheral wall having a spring engagement recess at one end of said cutout portion engageable with said bottom arm of said torsion coil spring to retain therein a portion of said second arm when said arm is urged toward said one end of the cutout portion by the resiliency of said torsion coil spring before the second arm is anchored to the mount surface, and keep said torsion coil spring in position against said top wall, resisting removal of the coil spring from said internal space through said opening, said engagement recess having a cross-section in the form of a semi-circle with a diameter greater than said given dimension of said bottom arm to engage under a bottom portion of said bottom arm to maintain said spring in its position against said top wall.

* * * * *

UNITED STATES PATENT AND TRADEMARK OFFICE
CERTIFICATE OF CORRECTION

PATENT NO.     : 6,428,435 B1
DATED          : August 6, 2002
INVENTOR(S)    : Kumakura et al.

Figure 7:
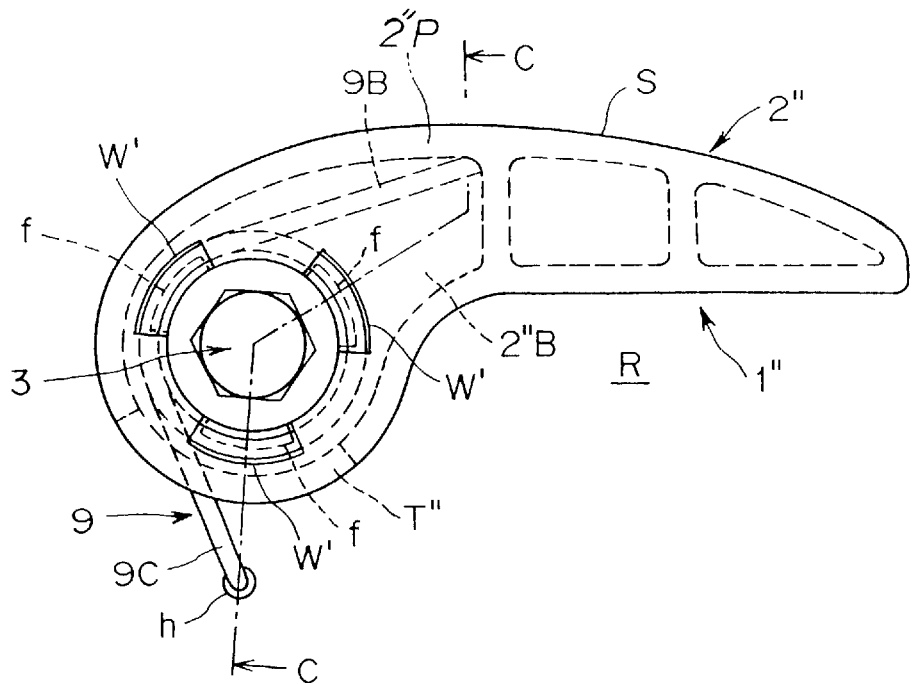
FIG. 7 is a front elevational view of a tensioner lever according to a third embodiment of the present invention.
Figure 8:
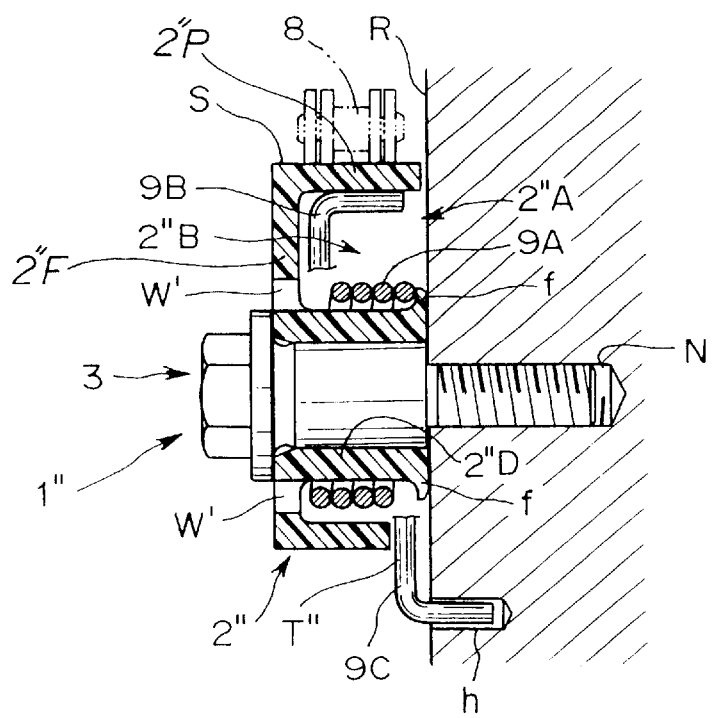
FIG. 8 is a cross-sectional view taken along line 8–8 of FIG. 7.
Figure 9:
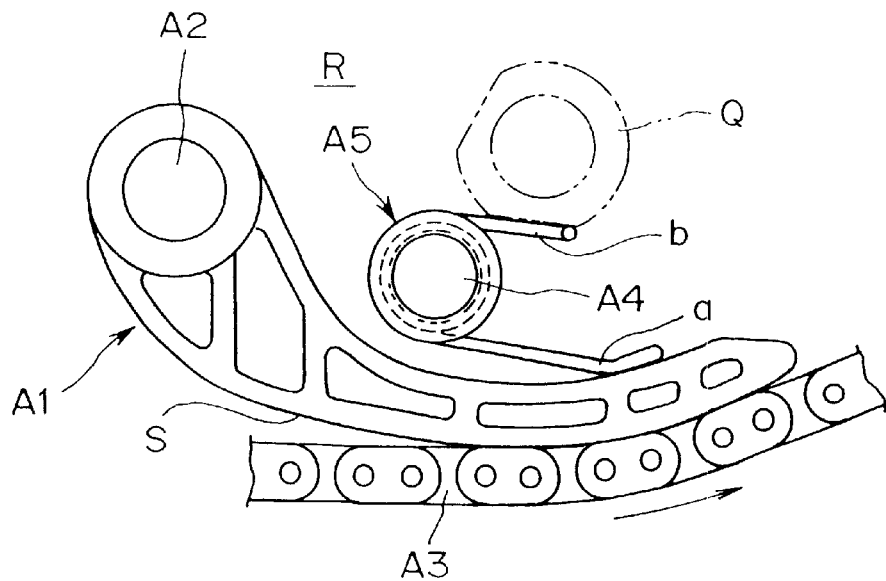
FIG. 9 is a front elevational view showing a portion of a chain drive including a conventional tensioner lever.
Figure 10:
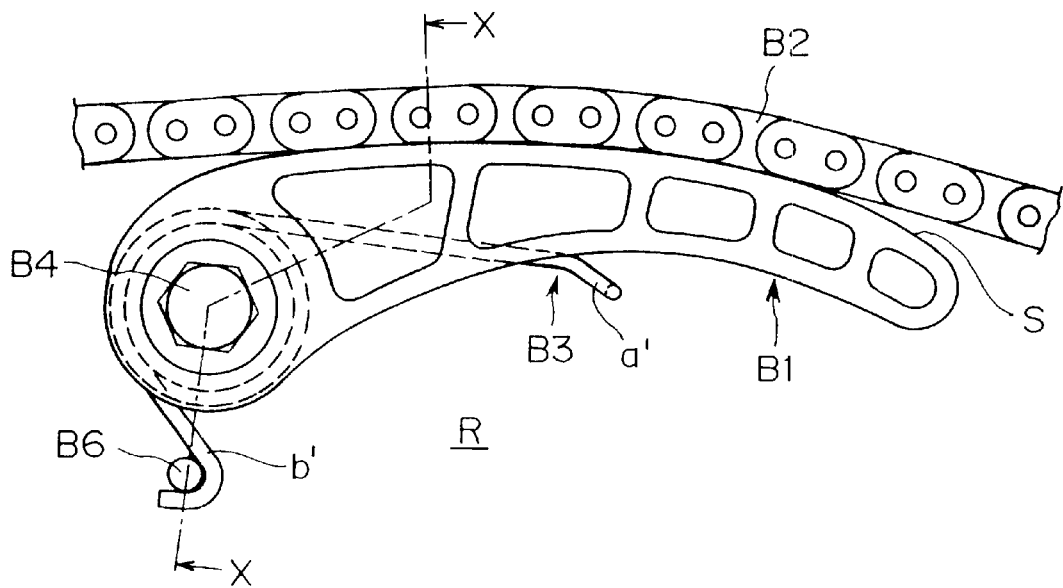
FIG. 10 is a view similar to FIG. 9, but showing another conventional tensioner lever.
Figure 11:
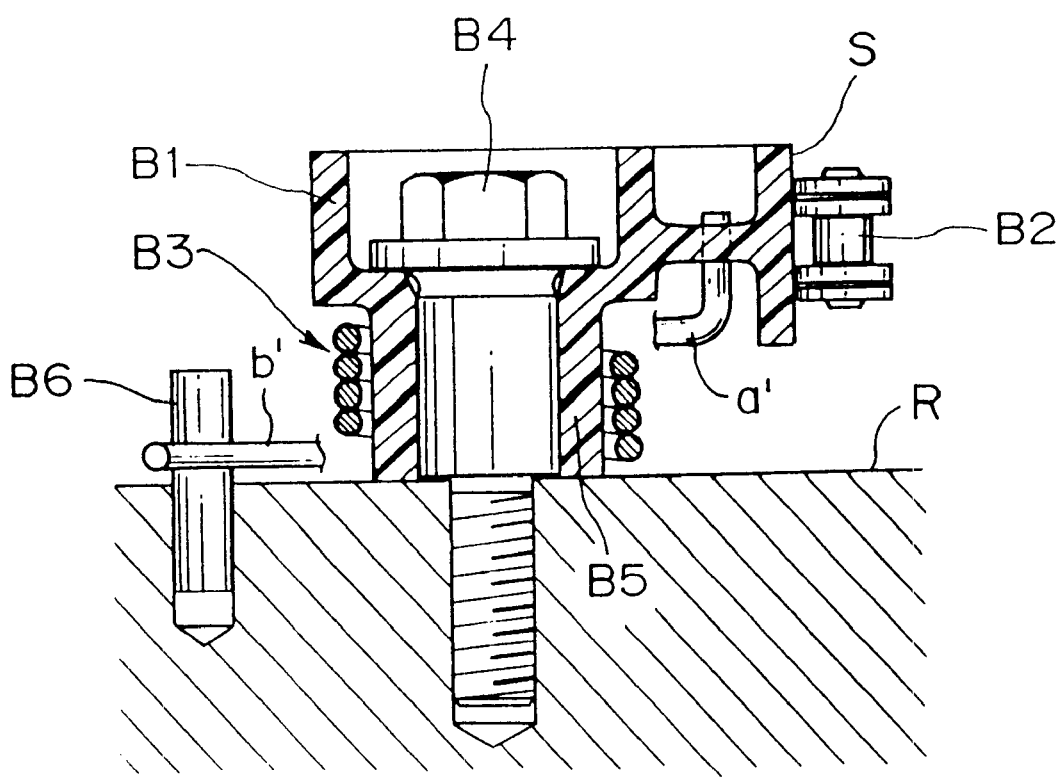
FIG. 11 is a cross-sectional view taken along line 11–11 of FIG. 10.

It is certified that error appears in the above-identified patent and that said Letters Patent is hereby corrected as shown below:

Column 1,
Line 49, "lever B1" should be -- lever B5 --;

Column 5,
Line 7, "oil" should be -- coil --;
Line 49, "engage" should be -- engaged --;

Column 6,
Line 13, after "body 2'." delete the rest of the line
Lines 14 and 15, delete in their entirety;
Between lines 15 and 16, insert the following paragraph: -- FIGS. 7 and 8 show a tensioner lever according to a third embodiment of the present invention.
The illustrated tensioner lever 1" differs from those 1 and 1' of the foregoing embodiments only in the structure of a lever body 2";

Column 7,
Line 13, "wagi" should be -- wall --.

Signed and Sealed this

Seventh Day of October, 2003

JAMES E. ROGAN
*Director of the United States Patent and Trademark Office*